United States Patent
Uka et al.

(10) Patent No.: US 12,113,198 B2
(45) Date of Patent: Oct. 8, 2024

(54) POSITIVE ELECTRODE FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventors: Youichirou Uka, Hyogo (JP); Rie Matsuoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 523 days.

(21) Appl. No.: 17/426,045

(22) PCT Filed: Dec. 18, 2019

(86) PCT No.: PCT/JP2019/049644
§ 371 (c)(1),
(2) Date: Jul. 27, 2021

(87) PCT Pub. No.: WO2020/158224
PCT Pub. Date: Aug. 6, 2020

(65) Prior Publication Data
US 2022/0115635 A1 Apr. 14, 2022

(30) Foreign Application Priority Data
Jan. 31, 2019 (JP) .................. 2019-016035

(51) Int. Cl.
*H01M 4/131* (2010.01)
*H01M 4/04* (2006.01)
(Continued)

(52) U.S. Cl.
CPC ......... *H01M 4/131* (2013.01); *H01M 4/0404* (2013.01); *H01M 4/133* (2013.01);
(Continued)

(58) Field of Classification Search
CPC .. H01M 4/131; H01M 50/107; H01M 4/0404; H01M 4/133
See application file for complete search history.

(56) References Cited

U.S. PATENT DOCUMENTS

2006/0222952 A1* 10/2006 Kono .................. H01M 4/5825
429/231.95
2013/0122354 A1  5/2013 Sugimori et al.
2018/0250640 A1* 9/2018 Sugawara ............. B01D 71/68

FOREIGN PATENT DOCUMENTS

JP  2003-157846 A  5/2003
JP  2003-331847 A  11/2003
(Continued)

OTHER PUBLICATIONS

Search Report dated Sep. 8, 2023, issued in counterpart CN Application No. 201980090554.6. (3 pages).
(Continued)

*Primary Examiner* — Olatunji A Godo
(74) *Attorney, Agent, or Firm* — WHDA, LLP

(57) ABSTRACT

This positive electrode for nonaqueous electrolyte secondary batteries is provided with a collector and a mixture layer that is formed on the collector. The mixture layer comprises: a lithium transition metal oxide that contains more than 50% by mole of Ni relative to the total number of moles of metal elements other than Li; a carbon material; a polymer compound that is soluble in N-methyl-2-pyrrolidone, while having a ring structure in each repeating unit; and a polyoxyethylene amine compound.

7 Claims, 1 Drawing Sheet

(51) Int. Cl.
*H01M 4/133* (2010.01)
*H01M 4/505* (2010.01)
*H01M 4/525* (2010.01)
*H01M 4/62* (2006.01)
*H01M 50/107* (2021.01)
*H01M 4/02* (2006.01)

(52) U.S. Cl.
CPC ........... *H01M 4/505* (2013.01); *H01M 4/525* (2013.01); *H01M 4/621* (2013.01); *H01M 50/107* (2021.01); *H01M 2004/027* (2013.01); *H01M 2004/028* (2013.01)

(56) References Cited

FOREIGN PATENT DOCUMENTS

| | | |
|---|---|---|
| JP | 2014-29788 A | 2/2014 |
| JP | 2014-130775 A | 7/2014 |
| JP | 2015-30777 A | 2/2015 |
| JP | 2016-134218 A | 7/2016 |
| WO | 2012/014616 A1 | 2/2012 |
| WO | 2015/111710 A1 | 7/2015 |

OTHER PUBLICATIONS

International Search Report dated Feb. 25, 2020, issued in counterpart International Application No. PCT/JP2019/049644. (3 pages).

* cited by examiner

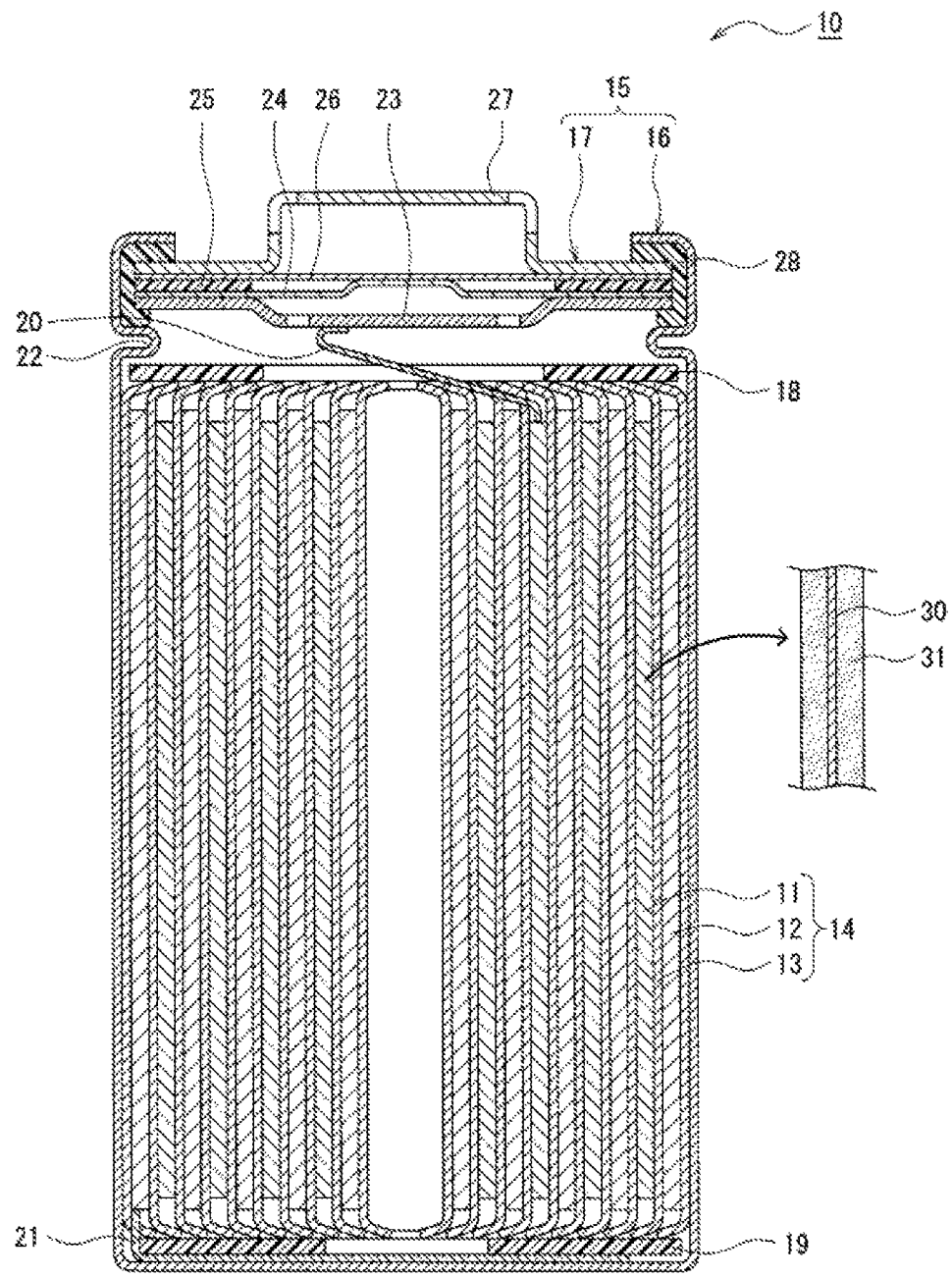

POSITIVE ELECTRODE FOR NONAQUEOUS ELECTROLYTE SECONDARY BATTERIES, AND NONAQUEOUS ELECTROLYTE SECONDARY BATTERY

TECHNICAL FIELD

The present disclosure relates to a positive electrode for nonaqueous electrolyte secondary batteries and a nonaqueous electrolyte secondary battery.

BACKGROUND

In recent years, nonaqueous electrolyte secondary batteries including a positive electrode, a negative electrode, and a nonaqueous electrolyte, in which lithium ions and the like move between the positive electrode and the negative electrode for charging and discharging, are being widely used as secondary batteries with high output and high energy density. The positive electrode includes a collector and a mixture layer formed on the collector.

Patent Document 1, for example, discloses a mixture layer including a positive electrode active material, carbon black, a vinyl alcohol skeleton containing resin, and an amine compound.

Lithium transition metal oxides are typically used for the positive electrode active material. In recent years, lithium transition metal oxides containing more than 50% by mole of Ni relative to the total number of moles of metal elements other than Li have been attracting attention as positive electrode active materials with a high battery capacity.

CITATION LIST

Patent Literature

Patent Document 1: JP 2015-30777 A

SUMMARY

The mixture layer is formed by coating a collector with a slurry containing a positive electrode active material and a conductive material made of a carbon material such as carbon black, for example, dispersed in a solvent such as N-methyl-2-pyrrolidone, and drying the slurry. The carbon material is added to ensure the electron conductivity of the mixture layer. However, coexistence of the carbon material with a lithium transition metal oxide containing more than 50% by mole of Ni relative to the total number of moles of metal elements other than Li in the slurry may cause aggregation of the carbon material to thereby reduce dispersibility of the carbon material. This results in uneven distribution of the carbon material within the mixture layer, thereby lowering the electron conductivity of the mixture layer. This configuration therefore decreases the battery capacity despite the use of a lithium transition metal oxide containing more than 50% by mole of Ni relative to the total number of moles of metal elements other than Li.

Embodiments of the disclosure are directed toward providing a positive electrode for a nonaqueous electrolyte secondary battery, and a nonaqueous electrolyte secondary battery, that include, as a positive electrode active material, a lithium transition metal oxide containing more than 50% by mole of Ni relative to the total number of moles of metal elements other than Li, while inhibiting a reduction in the battery capacity.

In accordance with an aspect of the present disclosure, a positive electrode for a nonaqueous electrolyte secondary battery includes a collector and a mixture layer formed on the collector. The mixture layer includes a lithium transition metal oxide that contains more than 50% by mole of Ni relative to the total number of moles of metal elements other than Li, a carbon material, a polymer compound that is soluble in N-methyl-2-pyrrolidone, and has a ring structure in a repeating unit, and a polyoxyethylene amine compound.

In accordance with a further aspect of the disclosure, a nonaqueous electrolyte secondary battery includes the positive electrode described above, a negative electrode, and a nonaqueous electrolyte.

In accordance with an aspect of the disclosure, it is possible to inhibit reduction in the battery capacity.

BRIEF DESCRIPTION OF DRAWINGS

FIG. 1 is a cross sectional view of a nonaqueous electrolyte secondary battery according to an example embodiment.

DESCRIPTION OF EMBODIMENTS

As described above, an attempt to form a mixture layer with a slurry having a lithium transition metal oxide that contains more than 50% by mole of Ni relative to the total number of moles of metal elements other than Li and a carbon material dispersed in a solvent such as N-methyl-2-pyrrolidone may result in aggregation of the carbon material. It is assumed that this phenomenon occurs due to an acid-base interaction of the lithium transition metal oxide having an Ni ratio of more than 50%, which has high basicity on its surface, with a functional group (such as carboxyl group) on the carbon material surface, causing aggregation of the carbon material on the lithium transition metal oxide surface. Consequently, a mixture layer formed by applying and drying such a slurry on a collector contains the carbon material unevenly dispersed therein, which may deteriorate the electron conductivity of the mixture layer to thereby lower the battery capacity. After diligent studies for inhibiting such a battery capacity reduction, the present inventors conceived of the positive electrode active material for nonaqueous electrolyte secondary batteries according to the embodiments described below.

A positive electrode for a nonaqueous electrolyte secondary battery in accordance with an aspect of the present disclosure includes a collector and a mixture layer formed on the collector. The mixture layer includes a lithium transition metal oxide that contains more than 50% by mole of Ni relative to the total number of moles of metal elements other than Li, a carbon material, a polymer compound that is soluble in N-methyl-2-pyrrolidone and has a ring structure in a repeating unit, and a polyoxyethylene amine compound. The positive electrode for a nonaqueous electrolyte secondary battery in accordance with the aspect of the present disclosure inhibits a reduction in the battery capacity. While mechanisms that achieve this advantage have not been sufficiently revealed, the following points are conjectured.

The mixture layer is formed, for example, by applying and drying, on a collector, a slurry containing the lithium transition metal oxide described above, the polymer compound described above, the polyoxyethylene amine compound described above, and a solvent such as N-methyl-2-pyrrolidone. Here, it is considered that the polyoxyethylene amine compound contained in the mixture layer reduces the acid-base interaction between the basic component on the surface of the lithium transition metal oxide having an Ni ratio of more than 50% and the functional group on the carbon material surface, and the ring structure of the polymer compound contained in the mixture layer provides steric hindrance to reduce statistic interaction between the carbon materials, thereby preventing aggregation of the carbon material. Polymer compounds that are insoluble in N-methyl-2-pyrrolidone or that do not have a ring structure would not sufficiently provide steric hindrance effects on the carbon material, failing to sufficiently inhibit aggregation of the carbon material. Meanwhile, the mixture layer including a lithium transition metal oxide that contains more than 50% by mole of Ni relative to the total number of moles of metal elements other than Li, a carbon material, a polymer compound that is soluble in N-methyl-2-pyrrolidone and has a ring structure in a repeating unit, and a polyoxyethylene amine compound, prevents uneven distribution of the carbon material to thereby allow relatively even distribution of the carbon material, and therefore ensures the electron conductivity of the mixture layer while inhibiting the battery capacity reduction.

N-methyl-2-pyrrolidone is used as a solvent in which a lithium transition metal oxide and the like are to be dispersed for slurrying. Such a solvent for slurrying may include, in addition to N-methyl-2-pyrrolidone, amide solvents such as N, N-dimethylformamide and N, N-dimethylacetamide, sulfur oxide solvents such as dimethylsulfoxide, dimethylsulfone, and tetramethylenesulfone, ketone solvents such as acetone and methyl ethyl ketone, nitrile solvents such as acetonitrile and propionitrile, for example. Here, the mixture layer of the disclosure is not restricted to a mixture layer formed with N-methyl-2-pyrrolidone used as a slurrying solvent, and may be a mixture layer formed using a slurrying solvent other than N-methyl-2-pyrrolidone. In this case however, it is required that a slurrying solvent in which a polymer compound that is soluble in N-methyl-2-pyrrolidone and has a ring structure in each repeating unit is to be dissolved should be used. Typically, a polymer compound that is soluble in N-methyl-2-pyrrolidone is also soluble in polyvinyl alcohol, polyethylene glycol, polyalkylene oxide, polyamide, polyester, polyurethane, and an acrylic resin, for example.

An example embodiment will be described in detail below. Although the following description describes, by way of example, a cylindrical battery including a wound electrode assembly 14 housed in a cylindrical battery case, the electrode assembly is not limited to a wound electrode assembly and may be a laminated electrode assembly that includes a plurality of positive electrodes and a plurality of negative electrodes alternately laminated with a separator therebetween. The battery case may have any shape other than a cylindrical shape, and may be a metal case having a prismatic shape (prismatic battery) or a coin shape (coin-shaped battery), for example, or a resin case (laminate battery) formed of a resin film.

FIG. 1 is a cross-sectional view of a nonaqueous electrolyte secondary battery 10 according to an example embodiment. As illustrated in FIG. 1, the nonaqueous electrolyte secondary battery 10 includes an electrode assembly 14, a nonaqueous electrolyte (not shown), and a battery case 15 that receives the electrode assembly 14 and the nonaqueous electrolyte. The electrode assembly 14 includes a positive electrode 11, a negative electrode 12, and a separator 13, and has a wound configuration in which the positive electrode 11 and the negative electrode 12 are wound with the separator 13 therebetween. The battery case 15 includes an exterior can 16 having a cylindrical shape with a closed bottom and a sealing structure 17 that closes an opening of the exterior can 16.

The nonaqueous electrolyte includes a nonaqueous solvent and an electrolyte salt dissolved in the nonaqueous solvent. Examples of the nonaqueous solvent may include esters, ethers, nitriles, amides, and mixture solvents of two or more thereof. The nonaqueous solvent may contain a halogen substitution product of these solvents in which hydrogens of the solvents are, at least in part, substituted with a halogen atom such as fluorine. The electrolyte is not limited to a liquid electrolyte and may be a solid electrolyte containing, for example, a gel polymer. The electrolyte salt may be, for example, a lithium salt such as $LiPF_6$.

The exterior can 16 is, for example, a cylindrical metal container with a closed bottom. A gasket 28 is disposed between the exterior can 16 and the sealing structure 17 to ensure airtightness within the battery. The exterior can 16 includes a protruding portion 22 which is an inwardly protruding portion of part of a side face of the exterior can 16, for example, to support the sealing structure 17. The protruding portion 22 is preferably formed annularly along the circumferential direction of the exterior can 16, and supports the sealing structure 17 with its top surface.

The sealing structure 17 has a configuration in which a filter 23, a lower valve element 24, an insulating member 25, an upper valve element 26, and a cap 27 are stacked in sequence from the side closer to the electrode assembly 14. The components of the sealing structure 17 have, for example, either a disc shape or a ring shape and are, except for the insulating member 25, electrically connected to each other. The lower valve element 24 and the upper valve element 26 are connected to each other at their center portions, and the insulating member 25 is interposed between their peripheral portions. In response to an increase in internal pressure of the battery due to abnormal heat generation, the lower valve element 24 deforms so as to push the upper valve element 26 toward the cap 27 and breaks, thereby interrupting the current path between the lower valve element 24 and the upper valve element 26. In response to a further increase in the internal pressure, the upper valve element 26 breaks, letting gas escape through an opening of the cap 27.

The nonaqueous electrolyte secondary battery 10 includes insulating plates 18 and 19 respectively disposed on top and bottom of the electrode assembly 14. In the example illustrated in FIG. 1, a positive electrode lead 20 attached to the positive electrode 11 extends through a through hole in the insulating plate 18 toward the sealing structure 17, and a negative electrode lead 21 attached to the negative electrode 12 passes external to the insulating plate 19 and extends toward the bottom of the exterior can 16. The positive electrode lead 20 is connected to an underside of the filter 23 that serves as a bottom plate of the sealing structure 17, by welding, for example, and the cap 27 that is a top plate of the sealing structure 17 electrically connected to the filter 23 serves as a positive electrode terminal. The negative electrode lead 21 is connected to an inner surface of the bottom of the exterior can 16 by, for example, welding, and the exterior can 16 serves as a negative electrode terminal.

The electrode assembly 14, particularly the positive electrode 11, will be described in detail below.

Positive Electrode

The positive electrode 11 includes a positive electrode collector 30 and a positive electrode mixture layer 31 disposed on the collector. The positive electrode collector 30 may include a foil of a metal, such as aluminum, that is stable in the potential range of the positive electrode 11 or a film having such a metal disposed as a surface layer, for example. The positive electrode mixture layer 31 includes a positive electrode active material, a carbon material serving as a conductive material, a polymer compound that is soluble in N-methyl-2-pyrrolidone, while having a ring structure in each repeating unit (which may be referred to simply as a polymer compound), and a polyoxyethylene amine compound. The positive electrode mixture layer 31 preferably includes a binder in terms of adhesiveness to the positive electrode collector 30.

The positive electrode 11 may be produced as follows: a positive electrode mixture slurry including a positive electrode active material, a carbon material, a polymer compound, a polyoxyethylene amine compound, a binder material, a slurrying solvent (N-methyl-2-pyrrolidone, for example), for example, is applied on the positive electrode collector 30, and, after drying the applied membrane, the applied membrane is rolled to form the positive electrode mixture layers 31 on respective surfaces of the positive electrode collector 30.

The positive electrode active material includes a lithium transition metal oxide containing more than 50% by mole of Ni relative to the total number of moles of metal elements other than Li (which may be hereinafter referred to as a "high ratio Ni containing lithium transition metal oxide"). To achieve an increased battery capacity, the high ratio Ni containing lithium transition metal oxide preferably contains more than 80% by mole of Ni, and more preferably more than 90% by mole of Ni, relative to the total number of moles of metal elements other than Li. The high ratio Ni containing lithium transition metal oxide may contain metal elements other than Li and Ni, and preferably contains at least one selected from the group consisting of Co, Mn, and Al, for example.

The high ratio Ni containing lithium transition metal oxide is preferably an oxide represented, for example, by a general formula $Li_xNi_{1-y-z}Co_yM_zO_2$ (where $0.9 \le x \le 1.3$, $0 < y+z < 0.5$, M includes at least one of Mn or Al). The metal element M may include at least one selected from the group consisting of Zr, B, Mg, Ti, Fe, Cu, Zn, Sn, Na, K, Ba, Sr, Ca, W, Mo, Nb, and Si, in addition to Li, Ni, Co, Mn, and Al. The particle surface of the high ratio Ni containing lithium transition metal oxide may be covered with fine particles of inorganic compound such as an oxide such as an aluminum oxide, a phosphate compound, or a boric acid compound, for example. The positive electrode active material contained in the positive electrode mixture layer 31 may further include a material other than the high ratio Ni containing lithium transition metal oxide described above.

Examples of the carbon material contained in the positive electrode mixture layer 31 include carbon black such as acetylene black and Ketjenblack, graphite, carbon fibers such as carbon nanotubes and graphene, for example. These materials may be used alone or may be used in combinations of two or more thereof. The content of the carbon material to be added is, for example, 0.1 to 10 parts by mass, preferably 0.2 to 2 parts by mass, relative to 100 parts by mass of the positive electrode active material.

While the polymer compound contained in the positive electrode mixture layer 31 may be any compounds that are soluble in N-methyl-2-pyrrolidone and have a ring structure in a repeating unit so as to provide steric hindrance for the carbon material, the ring structure preferably includes a 5 or more-membered ring structure in a repeating unit.

Examples of the polymer compound include cellulosic polymer compounds such as hydroxypropylmethylcellulose, hydroxyethylcellulose, and hydroxypropylcellulose, vinyl polymer compounds such as polyvinylpyrrolidone and polystyrene, nitrogen-containing polymer compounds such as polyimide, and conjugated polymer compounds such as polyaniline. Among these polymer compounds, the cellulosic polymer compounds and the vinyl polymer compounds are preferable, and hydroxypropyl methylcellulose and polyvinylpyrrolidone are particularly preferable, in terms of their functions as steric hindrance on the carbon materials.

The weight average molecular weight of the polymer compound is not limited to a specific range, but is preferably in the range from 1,000 to 10,000,000, and is more preferably in the range from 10,000 to 2,000,000, and is preferably in the range from 50,000 to 2,000,000, for example, to facilitate its function as steric hindrance on the carbon material. The weight average molecular weight can be measured by a known method, such as a GPC method.

The content of the polymer compound is preferably in the range of 1 to 50% by mass, and more preferably in the range of 2 to 30% by mass, relative to the mass of the carbon material. The polymer compound with a content of less than 1% by mass may fail to provide sufficient function as steric hindrance to the carbon material, resulting in a possible reduction in the electron conductivity of the positive electrode mixture layer 31 when compared to the polymer compound having the content of the above-described range. The polymer compound with a content over 50% by mass serves as a resistance material, which also causes a possible reduction in the electron conductivity of the positive electrode mixture layer 31 when compared to the polymer compound with the above-described range of content. A particularly preferable content of the polymer compound depends on a type of the carbon material. When carbon black is used as the carbon material, the content of the polymer compound is preferably in the range of 1 to 50% by mass relative to the mass of the carbon material. When carbon nanotube is used as the carbon material, the content of the polymer compound is preferably in the range of 5 to 30% by mass relative to the mass of the carbon material.

The polyoxyethylene amine compound contained in the positive electrode mixture layer 31 includes, for example, polyoxyethylene alkylamino ether, polyoxyethylene oleylamino ether, and polyoxyethylene diamino ether. The alkyl groups in these compounds are added to improve the surface-activity of the compound, and may be other hydrophobic functional groups such as phenyl groups, for example. Among these example, polyoxyethylene alkylamino ether or polyoxyethylene diamino ether is preferable due to high mitigation effect for the acid-base interaction between the basic component on the surface of the high Ni content containing lithium transition metal oxide and the functional group on the surface of the carbon material.

Polyoxyethylene alkylamino ether can be represented by the following general formula (1-1), for example:

[Chemical Formula 1]

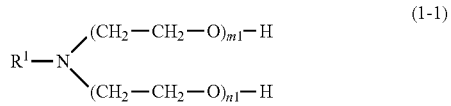

(1-1)

In the above formula, $R^1$ represents an alkyl group having a carbon number of, for example, 1 to 18, and preferably 8 to 12. In the above formula, m1 and n1 (the number of moles of ethylene oxide) are each integer numbers of 1 or greater, which is preferably 2≤(m1+n1)≤30, and more preferably 4≤(m1+n1)≤10. Here, R1 having too great a number may make polyoxyethylene alkylamino ether itself a resistance component to thereby reduce the electron conductivity of the positive electrode mixture layer 31, whereas having too small a number may lower the surface activity of polyoxyethylene alkylamino ether itself to thereby deteriorate the function. When the values of m1 and n1 are too great, polyoxyethylene alkylamino ether itself serves as a resistance component, resulting in a possible reduction in the electron conductivity of the positive electrode mixture layer 31, whereas when the values of m1 and n1 are too small, solubility of polyoxyethylene alkylamino ether itself may be lowered.

Polyoxyethylene diamino ether is represented by the following general formula (1-2), for example.

[Chemical Formula 2]

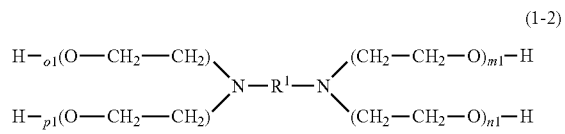

(1-2)

In the above formula, $R^1$ represents an alkyl group having a carbon number of, for example, 2 to 18, and preferably 2 to 10. In the above formula, m1, n1, o1, and p1 (the number of moles of ethylene oxide) are each integer numbers of 1 or greater, which is preferably 2≤(m1+n1+o1+p1)≤30, and more preferably 4≤(m1+n1+o1+p1)≤10. Here, R1 having too great a number may make polyoxyethylene diamino ether itself a resistance component to thereby reduce the electron conductivity of the positive electrode mixture layer 31, whereas R1 having too small a number may lower the surface activity of polyoxyethylene diamino ether itself to thereby deteriorate the function. When the values of m1, n1, o1, and p1 are too great, polyoxyethylene diamino ether itself serves as a resistance component, resulting in a possible reduction in the electron conductivity of the positive electrode mixture layer 31, whereas when the values of m1, n1, o1, and p1 are too small, solubility of polyoxyethylene diamino ether itself in a solvent may be lowered. R1 may contain alkyl ether such as ethylene oxide between carbons.

The content of the polyoxyethylene amine compound is preferably in the range of 1 to 50% by mass, and more preferably in the range of 2 to 30% by mass, relative to the mass of the carbon material. The polyoxyethylene amine compound having a content of less than 1% by mass may fail to provide sufficient mitigation effect between the basic component of the high Ni ratio containing lithium transition metal oxide surface and the functional group on the carbon material surface, which may result in deterioration of the electron conductivity of the positive electrode mixture layer 31 as compared to the polyoxyethylene amine compound having the content of the above-described range. The content of the polyoxyethylene amine compound over 50% by mass makes the polyoxyethylene amine compound a resistance component, which may lower the electron conductivity of the positive electrode mixture layer 31 as compared to the polyoxyethylene amine compound having a content that satisfies the above range.

Examples of the binder contained in the positive electrode mixture layer 31 include fluorine-containing resins such as polytetrafluoroethylene (PTFE) and polyvinylidene fluoride (PVdF), polyacrylonitrile (PAN), acrylic resins, and polyolefins. These materials may be used alone or two or more of the materials may be used in combination. The content of the binder is, for example, 0.1 to 3 parts by mass, preferably 0.5 to 2 parts by mass, relative to 100 parts by mass of the positive electrode active material.

While a preferable example of the slurring solvent for use in forming the positive electrode mixture layer 31 is N-methyl-2-pyrrolidone, for example, conventional slurrying solvents including an amide solvent such as N, N-dimethylformamide and N, N-dimethylacetamide, a sulfur oxide solvent such as dimethylsulfoxide, dimethylsulfone, and tetramethylenesulfone, a ketone solvent such as acetone and methyl ethyl ketone, and a nitrile solvent such as acetonitrile and propionitrile, for example, may be used.

Negative Electrode

The negative electrode 12 includes a negative electrode collector and a negative electrode mixture layer disposed on the collector. The negative electrode collector may be a metal foil, such as copper, that is stable in the potential range of the negative electrode 12 or a film having such a metal on a surface, for example. The negative electrode mixture layer includes a negative electrode active material and a binder, and is disposed on each of opposite surfaces of the negative electrode collector. The negative electrode can be fabricated as follows: a negative electrode mixture slurry containing the negative electrode active material, the binder, and the like is applied onto the negative electrode collector and the applied membranes are dried and then rolled, thereby forming the negative electrode mixture layers on the respective surfaces of the negative electrode collector.

The negative electrode active material may be any materials that can reversibly occlude and release lithium ions, including, for example, a carbon material such as natural graphite or artificial graphite, a metal such as silicon (Si) and tin (Sn) which forms an alloy with Li, or an oxide containing a metal element of Si or Sn, for example. The negative electrode mixture layer may contain a lithium titanium composite oxide, which functions as the negative electrode active material. The negative electrode mixture layer containing a lithium titanium composite oxide preferably includes a conductive material such as carbon black.

Example materials used for the binder contained in the negative electrode mixture layer include, for example, a fluorine-containing resin such as PTFE and PVdF, PVP, PAN, a polyimide resin, an acrylic resin, and polyolefins, for example. When an aqueous solvent is used for preparing the negative electrode mixture slurry, CMC or a salt thereof, styrene-butadiene rubber (SBR), polyacrylic acid (PAA) or a salt thereof, or polyvinyl alcohol (PVA), maybe used as the binder.

Separator

The separator 13 is an ion-permeable and insulating porous sheet, for example. Examples of the porous sheet include a microporous thin film, woven fabric, and non-woven fabric. Suitable examples of the material for the separator 13 include an olefin resin such as polyethylene and polypropylene, and cellulose. The separator 13 may have either a single-layer structure or a multilayer structure. The separator 13 may include, on its surface, a porous layer containing a filler of an inorganic compound or a porous layer formed from a highly heat-resistant resin such as an aramid resin.

EXAMPLES

The present disclosure will be further described below with reference to examples; however, the present disclosure is not limited to these examples.

Example 1-1

Preparation of Carbon Paste

Acetylene black serving as a carbon material, PVdF (binder), hydroxypropyl methylcellulose (weight average molecular weight: 100,000) serving as a polymer compound that is soluble in N-methyl-2-pyrrolidone (NMP) and has a ring structure in a repeating unit, and polyoxyethylene alkylamino ether serving as a polyoxyethylene amine compound, at the mass ratio of 100:10:5:5, were mixed in N-methyl-2-pyrrolidone (NMP) until the solid content of the acetylene black is not visually recognizable, to thereby prepare a carbon paste. Polyoxyethylene alkylamino ether is represented by the general formula (1-1) described above, $R^1$ is an alkyl group having a carbon number of 12, and m1+n1 is 2.

Preparation of Positive Electrode

A lithium transition metal oxide represented by $LiNi_{0.9}Co_{0.07}Al_{0.03}O_2$ was used as a positive electrode active material. The positive electrode active material, the carbon content in the carbon paste, and the total content of PVdF contained in the carbon paste and PVdF added for preparing the positive electrode slurry were mixed at the solid content mass ratio of 100:1:1, and NMP was added to the mixture, to thereby prepare a positive electrode mixture slurry. Subsequently, the positive electrode mixture slurry was applied to each of the opposite surfaces of the positive electrode collector formed of an aluminum foil, and the applied membranes (positive electrode mixture layer) were dried and rolled by a roll pressing machine. The positive electrode mixture layer was then cut into a predetermined electrode size, to thereby obtain a positive electrode (working electrode) including the mixture layers on the opposite surfaces of the collector. Further, a positive electrode lead made of aluminum was attached to a portion of the positive electrode collector where the mixture layer was not formed.

Preparation of Test Cell

After an electrode assembly including the working electrode described above, a counter electrode, and a reference electrode with separators interposed between each electrode was housed within an external container, an electrolyte was injected into the external container which was then sealed, to thereby produce a test cell. The design capacity of the test cell was set to 100 mAh.

The counter electrode, the reference electrode, the separator, and the electrolyte are as follows.

Counter electrode: lithium metal
Reference electrode: lithium metal
Separator: polyethylene separator
Electrolyte: ethylene carbonate (EC) and ethyl methyl carbonate (EMC) were mixed in a volume ratio of 30:70 to obtain a nonaqueous solvent, and then $LiPF_6$ was dissolved in the nonaqueous solvent at a concentration of 1.0 mol/L.

Example 1-2

A test cell was prepared in a manner similar to that in EXAMPLE 1-1 except that, in producing the carbon paste, polyoxyethylene alkylamino ether that is represented by the general formula (1-1) described above where $R^1$ is an alkyl group having a carbon number of 12 and m1+n1 is 10 was used as a polyoxyethylene amine compound.

Example 1-3

A test cell was prepared in a manner similar to that in EXAMPLE 1-1 except that, in producing the carbon paste, the mass ratio of acetylene black, PVdF, hydroxypropyl methylcellulose, polyoxyethylene alkylamino ether was set to 100:10:5:8.

Example 1-4

A test cell was prepared in a manner similar to that in EXAMPLE 1-1 except that, in producing the carbon paste, polyoxyethylene alkylamino ether that is represented by the general formula (1-1) described above where $R^1$ is an alkyl group having a carbon number of 8 and m1+n1 is 10 was used as a polyoxyethylene amine compound.

Example 1-5

A test cell was prepared in a manner similar to that in EXAMPLE 1-1 except that, in producing the carbon paste, polyoxyethylene diamino ether that is represented by the general formula (1-2) described above where 1+n1+o1+p1 is 10 was used as a polyoxyethylene amine compound.

Example 1-6

A test cell was prepared in a manner similar to that in EXAMPLE 1-1 except that, in producing the carbon paste, polyoxyethylene alkylamino ether that is represented by the general formula (1-1) described above where $R^1$ is an alkyl group having a carbon number of 8 and m1+n1 is 10 was used as a polyoxyethylene amine compound and polyvinyl pyrrolidone (molecular weight: about 100,000) was used as a polymer compound that is soluble in NMP and has a ring structure in a repeating unit.

Example 1-7

A test cell was prepared in a manner similar to that in EXAMPLE 1-1 except that polyvinyl pyrrolidone (molecular weight: about 100,000) was used as a polymer compound that is soluble in NMP and has a ring structure in a repeating unit.

Example 1-8

A test cell was prepared in a manner similar to that in EXAMPLE 1-1 except that, in producing the carbon paste, polyoxyethylene alkylamino ether that is represented by the general formula (1-1) described above where $R^1$ is an alkyl group having a carbon number of 12 and m1+n1 is 4 was used as a polyoxyethylene amine compound and polyvinyl pyrrolidone (molecular weight: about 100,000) was used as a polymer compound that is soluble in NMP and has a ring structure in a repeating unit.

Example 1-9

A test cell was prepared in a manner similar to that in EXAMPLE 1-1 except that, in producing the carbon paste, polyoxyethylene alkylamino ether that is represented by the general formula (1-1) described above where $R^1$ is an alkyl group having a carbon number of 12 and m1+n1 is 10 was used as a polyoxyethylene amine compound and polyvinyl pyrrolidone (molecular weight: about 100,000) was used as a polymer compound that is soluble in NMP and has a ring structure in a repeating unit.

Example 1-10

A test cell was prepared in a manner similar to that in EXAMPLE 1-1 except that, in producing the carbon paste, polyoxyethylene alkylamino ether that is represented by the general formula (1-1) described above where $R^1$ is an alkyl group having a carbon number of 12 and m1+n1 is 10 was used as a polyoxyethylene amine compound, polyvinyl pyrrolidone (molecular weight: about 100,000) was used as a polymer compound that is soluble in NMP and has a ring structure in a repeating unit, and the mass ratio of acetylene black, PVdF, polyvinyl pyrrolidone, polyoxyethylene alkylamino ether was set to 100:10:5:8.

Example 1-11

A test cell was prepared in a manner similar to that in EXAMPLE 1-1 except that, in producing the carbon paste, polyoxyethylene alkylamino ether that is represented by the general formula (1-1) described above where $R^1$ is an alkyl group having a carbon number of 18 and m1+n1 is 10 was used as a polyoxyethylene amine compound and polyvinyl pyrrolidone (molecular weight: about 100,000) was used as a polymer compound that is soluble in NMP and has a ring structure in a repeating unit.

Example 1-12

A test cell was prepared in a manner similar to that in EXAMPLE 1-1 except that, in producing the carbon paste, polyoxyethylene alkylamino ether that is represented by the general formula (1-1) described above where $R^1$ is an alkyl group having a carbon number of 12 and m1+n1 is 30 was used as a polyoxyethylene amine compound and polyvinyl pyrrolidone (molecular weight: about 100,000) was used as a polymer compound that is soluble in NMP and has a ring structure in a repeating unit.

Example 1-13

A test cell was prepared in a manner similar to that in EXAMPLE 1-1 except that, in producing the carbon paste, polyoxyethylene diamino ether that is represented by the general formula (1-2) described above where 1+n1+o1+p1 is 10 was used as a polyoxyethylene amine compound and polyvinyl pyrrolidone (molecular weight: about 100,000) was used as a polymer compound that is soluble in NMP and has a ring structure in a repeating unit.

Comparative Example 1-1

A test cell was prepared in a manner similar to that in EXAMPLE 1-1 except that, in producing the carbon paste, acetylene black, PVdF, polyvinyl alcohol (molecular weight: 100,000), and octylamine, at the mass ratio of 100:10:5:5, were mixed in N-methyl-2-pyrrolidone (NMP) until the solid content of the acetylene black was not visually recognizable, without using a polymer compound that is soluble in NMP and has a ring structure in a repeating unit or a polyoxyethylene amine compound, to thereby prepare the carbon paste.

Comparative Example 1-2

A test cell was prepared in a manner similar to that in EXAMPLE 1-1 except that, in producing the carbon paste, acetylene black, PVdF, and polyvinyl alcohol (molecular weight: 100,000), at the mass ratio of 100:10:5, were mixed in N-methyl-2-pyrrolidone (NMP) until the solid content of the acetylene black was not visually recognizable, without using a polymer compound that is soluble in NMP and has a ring structure in a repeating unit or a polyoxyethylene amine compound, to thereby prepare the carbon paste.

Comparative Example 1-3

A test cell was prepared in a manner similar to that in EXAMPLE 1-1 except that, in producing the carbon paste, a polyoxyethylene amine compound was not used.

Comparative Example 1-4

A test cell was prepared in a manner similar to that in EXAMPLE 1-1 except that, in producing the carbon paste, a polymer compound that is soluble in NMP and has a ring structure in a repeating unit was not used and, polyoxyethylene alkylamino ether that is represented by the general formula (1-1) described above where $R^1$ is an alkyl group having a carbon number of 12 and m1+n1 is 10 was used as a polyoxyethylene amine compound.

Comparative Example 1-5

A test cell was prepared in a manner similar to that in EXAMPLE 1-1 except that, in producing the carbon paste, acetylene black and PVdF were mixed in N-methyl-2-pyrrolidone (NMP), at the mass ratio of 100:100, using a beads mill, and thereafter beads were removed, to thereby prepare the carbon paste, without using a polymer compound that is soluble in NMP and has a ring structure in a repeating unit or a polyoxyethylene amine compound.

For each of the test cells in EXAMPLES 1-1 to 1-13 and COMPARATIVE EXAMPLES 1-1 to 1-5, the following charge/discharge test was performed to measure the battery capacity. Each test cell was charged at a constant current of 50 mA under a temperature environment of 25° C. until the battery voltage reached 4.2 V, and thereafter charged at a constant voltage of 4.2 V until the current value reached 2 mA. Subsequently, after 10-minutes interruption, the cell was discharged at a constant current of 50 mA until the battery voltage reached 3.0 V. The discharge capacity at this time was determined as the battery capacity.

The battery capacities of the test cells in EXAMPLES 1-1 to 1-13 and COMPARATIVE EXAMPLES 1-2 to 1-5 were evaluated as relative values with reference to the battery capacity of the test cell in COMPARATIVE EXAMPLE 1-1 as a reference (100), and the results are provided in TABLES 1-1 and 1-2.

TABLE 1-1

| | Positive Electrode Active Material (NCA) | Polymer Compound | | Amine Compound | | | | |
|---|---|---|---|---|---|---|---|---|
| | Ni ratio (%) | Material | Ratio to CB | Material | R | EO | Ratio to CB | Battery Capacity |
| EXAMPLE 1-1 | 90 | hydroxypropyl methylcellulose | 5% | polyoxyethylene alkylamino ether | 12 | 2 | 5% | 102.1 |
| EXAMPLE 1-2 | 90 | hydroxypropyl methylcellulose | 5% | polyoxyethylene alkylamino ether | 12 | 10 | 5% | 102.0 |
| EXAMPLE 1-3 | 90 | hydroxypropyl methylcellulose | 5% | polyoxyethylene alkylamino ether | 12 | 10 | 8% | 102.4 |
| EXAMPLE 1-4 | 90 | hydroxypropyl methylcellulose | 5% | polyoxyethylene alkylamino ether | 8 | 10 | 5% | 101.8 |
| EXAMPLE 1-5 | 90 | hydroxypropyl methylcellulose | 5% | polyoxyethylene diamino ether | — | 10 | 5% | 102.0 |
| EXAMPLE 1-6 | 90 | polyvinyl pyrrolidone | 5% | polyoxyethylene alkylamino ether | 8 | 10 | 5% | 101.0 |
| EXAMPLE 1-7 | 90 | polyvinyl pyrrolidone | 5% | polyoxyethylene alkylamino ether | 12 | 2 | 5% | 102.1 |
| EXAMPLE 1-8 | 90 | polyvinyl pyrrolidone | 5% | polyoxyethylene alkylamino ether | 12 | 4 | 5% | 101.9 |
| EXAMPLE 1-9 | 90 | polyvinyl pyrrolidone | 5% | polyoxyethylene alkylamino ether | 12 | 10 | 5% | 101.7 |
| EXAMPLE 1-10 | 90 | polyvinyl pyrrolidone | 5% | polyoxyethylene alkylamino ether | 12 | 10 | 8% | 101.7 |
| EXAMPLE 1-11 | 90 | polyvinyl pyrrolidone | 5% | polyoxyethylene alkylamino ether | 18 | 10 | 5% | 101.0 |
| EXAMPLE 1-12 | 90 | polyvinyl pyrrolidone | 5% | polyoxyethylene alkylamino ether | 12 | 30 | 5% | 101.2 |
| EXAMPLE 1-13 | 90 | polyvinyl pyrrolidone | 5% | polyoxyethylene diamino ether | — | 10 | 5% | 101.3 |

R is a carbon number of alkyl group
EO is a number of moles of ethylene oxide (m1 + n1)
CB is conductive carbon material

TABLE 1-2

| | Positive Electrode Active Material (NCA) | Polymer Compound | | Amine Compound | | | | |
|---|---|---|---|---|---|---|---|---|
| | Ni ratio (%) | Material | Ratio to CB | Material | R | EO | Ratio to CB | Battery Capacity |
| COMPARATIVE EXAMPLE 1-1 | 90 | polyvinyl alcohol | 5% | octylamine | 8 | — | 5% | 100.0 |
| COMPARATIVE EXAMPLE 1-2 | 90 | polyvinyl alcohol | 5% | without | — | — | — | NG |
| COMPARATIVE EXAMPLE 1-3 | 90 | hydroxypropyl methylcellulose | 5% | without | — | — | — | 99.9 |
| COMPARATIVE EXAMPLE 1-4 | 90 | without | — | polyoxyethylene alkylamino ether | 12 | 10 | 5% | 100.1 |
| COMPARATIVE EXAMPLE 1-5 | 90 | | | without | | | | 92.7 |

R is a carbon number of alkyl group
EO is a number of moles of ethylene oxide (m1 + n1)
CB is conductive carbon material Example 2-1

A test cell was prepared in a manner similar to that in EXAMPLE 1-1 except that, in producing the carbon paste, polyoxyethylene alkylamino ether that is represented by the general formula (1-1) described above where $R^1$ is an alkyl group having a carbon number of 12 and m1+n1 is 10 was used as a polyoxyethylene amine compound and that, in preparing the positive electrode, a lithium transition metal oxide represented by $LiNi_{0.8}Co_{0.1}Mn_{0.1}O_2$ was used as a positive electrode active material.

Example 2-2

A test cell was prepared in a manner similar to that in EXAMPLE 1-1 except that, in producing the carbon paste, polyoxyethylene alkylamino ether that is represented by the general formula (1-1) described above where $R^1$ is an alkyl group having a carbon number of 12 and m1+n1 is 10 was used as a polyoxyethylene amine compound and polyvinyl pyrrolidone (molecular weight: about 100,000) was used as a polymer compound that is soluble in NMP and has a ring structure in a repeating unit, and that in preparing the positive electrode, the lithium transition metal oxide in EXAMPLE 2-1 was used.

Comparative Example 2-1

A test cell was prepared in a manner similar to that in EXAMPLES 1-1 except that, in producing the carbon paste, acetylene black, PVdF, polyvinyl alcohol (molecular weight: 100,000), and octylamine, at the mass ratio of 100:10:5:5, were mixed in N-methyl-2-pyrrolidone (NMP) until the solid content of the acetylene black was not visually recognizable, without using a polymer compound that is soluble in NMP and has a ring structure in a repeating unit or a polyoxyethylene amine compound, to thereby prepare the carbon paste, and that, in preparing the positive electrode, the lithium transition metal oxide in EXAMPLE 2-1 was used.

Comparative Example 2-2

A test cell was prepared in a manner similar to that in EXAMPLE 1-1 except that, in producing the carbon paste, acetylene black and PVdF were mixed in N-methyl-2-pyrrolidone (NMP), at the mass ratio of 100:100, using a beads mill, and thereafter beads were removed, to thereby prepare the carbon paste, without using a polymer compound that is soluble in NMP and has a ring structure in a repeating unit or a polyoxyethylene amine compound and that, in preparing the positive electrode, the lithium transition metal oxide in EXAMPLE 2-1 was used.

For each of the test cells in EXAMPLES 2-1 to 2-2 and COMPARATIVE EXAMPLES 2-1 to 2-2, a charge/discharge test was performed under the conditions similar to those in EXAMPLE 1-1 to measure the battery capacity. The battery capacities of the test cells in EXAMPLES 2-1 to 2-2 and COMPARATIVE EXAMPLE 2-2 were evaluated as relative values with reference to the battery capacity of the test cell in COMPARATIVE EXAMPLE 2-1 as a reference (100), and the results are provided in TABLE 2.

group having a carbon number of 12 and m1+n1 is 10 was used as a polyoxyethylene amine compound and polyvinyl pyrrolidone (molecular weight: about 100,000) was used as a polymer compound that is soluble in NMP and has a ring structure in a repeating unit, and that in preparing the positive electrode, the lithium transition metal oxide in EXAMPLE 3-1 was used.

Comparative Example 3-1

A test cell was prepared in a manner similar to that in EXAMPLE 1-1 except that, in producing the carbon paste, acetylene black, PVdF, polyvinyl alcohol (molecular weight: 100,000), and octylamine, at the mass ratio of 100:10:5:5, were mixed in N-methyl-2-pyrrolidone (NMP) until the solid content of the acetylene black was not visually recognizable, without using a polymer compound that is soluble in NMP and has a ring structure in a repeating unit or a polyoxyethylene amine compound, to thereby prepare the carbon paste, and that, in preparing the positive electrode, the lithium transition metal oxide in EXAMPLE 3-1 was used.

Comparative Example 3-2

A test cell was prepared in a manner similar to that in EXAMPLE 1-1 except that, in producing the carbon paste,

TABLE 2

| | Positive Electrode Active Material (NCM) | Polymer Compound | | Amine compound | | | | Battery Capacity |
|---|---|---|---|---|---|---|---|---|
| | Ni ratio (%) | Material | Ratio to CB | Material | R | EO | Ratio to CB | |
| EXAMPLE 2-1 | 80 | hydroxypropyl methylcellulose | 5% | polyoxyethylene alkylamino ether | 12 | 10 | 5% | 101.7 |
| EXAMPLE 2-2 | 80 | polyvinyl pyrrolidone | 5% | polyoxyethylene alkylamino ether | 12 | 10 | 5% | 101.4 |
| COMPARATIVE EXAMPLE 2-1 | 80 | polyvinyl alcohol | 5% | octylamine | 8 | — | 5% | 100.0 |
| COMPARATIVE EXAMPLE 2-2 | 80 | | | without | | | | 93.9 |

R is a carbon number of alkyl group

EO is the number of moles of ethylene oxide (m1 + n1)

CB is a conductive carbon material

Example 3-1

A test cell was prepared in a manner similar to that in EXAMPLE 1-1 except that, in producing the carbon paste, polyoxyethylene alkylamino ether that is represented by the general formula (1-1) described above where $R^1$ is an alkyl group having a carbon number of 12 and m1+n1 is 10 was used as a polyoxyethylene amine compound and that, in preparing the positive electrode, a lithium transition metal oxide represented by $LiNi_{0.6}Co_{0.2}Mn_{0.2}O_2$ was used as a positive electrode active material.

Example 3-2

A test cell was prepared in a manner similar to that in EXAMPLE 1-1 except that, in producing the carbon paste, polyoxyethylene alkylamino ether that is represented by the general formula (1-1) described above where $R^1$ is an alkyl acetylene black and PVdF were mixed in N-methyl-2-pyrrolidone (NMP) at the mass ratio of 100:100 using a beads mill, followed by removal of beads, to thereby prepare the carbon paste, without using a polymer compound that is soluble in NMP and has a ring structure in a repeating unit or a polyoxyethylene amine compound and that, in preparing the positive electrode, the lithium transition metal oxide in EXAMPLE 3-1 was used.

For each of the test cells in EXAMPLES 3-1 to 3-2 and COMPARATIVE EXAMPLES 3-1 to 3-2, a charge/discharge test was performed under the conditions similar to those in EXAMPLE 1-1 to measure the battery capacity. The battery capacities of the test cells in EXAMPLES 3-1 to 3-2 and COMPARATIVE EXAMPLE 3-2 were evaluated as relative values with reference to the battery capacity of the test cell in COMPARATIVE EXAMPLE 3-1 as a reference (100), and the results are provided in TABLE 3.

TABLE 3

| | Positive Electrode Active Material (NCM) Ni ratio (%) | Polymer Compound | | Amine Compound | | | | Battery Capacity |
|---|---|---|---|---|---|---|---|---|
| | | Material | Ratio to CB | Material | R | EO | Ratio to CB | |
| EXAMPLE 3-1 | 60 | hydroxypropyl methylcellulose | 5% | polyoxyethylene alkylamino ether | 12 | 10 | 5% | 100.9 |
| EXAMPLE 3-2 | 60 | polyvinyl pyrrolidone | 5% | polyoxyethylene alkylamino ether | 12 | 10 | 5% | 100.7 |
| COMPARATIVE EXAMPLE 3-1 | 60 | polyvinyl alcohol | 5% | octylamine | 8 | — | 5% | 100.0 |
| COMPARATIVE EXAMPLE 3-2 | 60 | | | without | | | | 97.1 |

R is a carbon number of alkyl group
EO is the number of moles of ethylene oxide (m1 + n1)
CB is a conductive carbon material As shown in TABLES 1-1 to 3, the test cells in the examples including a positive electrode mixture layer containing a polymer compound that is soluble in N-methyl-2-pyrrolidone and has a ring structure in a repeating unit and a polyoxyethylene amine compound had a higher battery capacity than the test cells in the comparative examples without at least one of such a polymer compound or a polyoxyethylene amine compound.

Reference Example 1-1

A test cell was prepared in a manner similar to that in EXAMPLE 1-1 except that, in producing the carbon paste, acetylene black, PVdF, polyvinyl alcohol (molecular weight: 100,000), and octylamine, at the mass ratio of 100:10:5:5, were mixed in N-methyl-2-pyrrolidone (NMP) until the solid content of the acetylene black was not visually recognizable, without using a polymer compound that is soluble in NMP and has a ring structure in a repeating unit or a polyoxyethylene amine compound, to thereby prepare the carbon paste, and that, in preparing the positive electrode, the lithium transition metal oxide represented by $LiNi_{0.5}Co_{0.25}Mn_{0.25}O_2$ was used.

Reference Example 1-2

A test cell was prepared in a manner similar to that in EXAMPLE 1-1 except that, in producing the carbon paste, polyoxyethylene alkylamino ether that is represented by the general formula (1-1) described above where $R^1$ is an alkyl group having a carbon number of 12 and m1+n1 is 10 was used as a polyoxyethylene amine compound and polyvinyl pyrrolidone (molecular weight: about 100,000) was used as a polymer compound that is soluble in NMP and has a ring structure in a repeating unit, and that in preparing the positive electrode, the lithium transition metal oxide in REFERENCE EXAMPLE 1-1 was used.

For each of the test cells in REFERENCE EXAMPLES 1-1 to 1-2, a charge/discharge test was performed under the conditions similar to those in EXAMPLE 1-1 to measure the battery capacity. The battery capacity of the test cell in REFERENCE EXAMPLE 1-2 was evaluated as a relative value with reference to the battery capacity of the test cell in REFERENCE EXAMPLE 1-1 as a reference (100), and the results are provided in TABLE 4.

TABLE 4

| | Positive Electrode Active Material (NCM) Ni ratio (%) | Polymer Compound | | Amine Compound | | | | Battery Capacity |
|---|---|---|---|---|---|---|---|---|
| | | Material | Ratio to CB | Material | R | EO | Ratio to CB | |
| REFERENCE EXAMPLE 1-1 | 50 | polyvinyl alcohol | 5% | octylamine | 8 | — | 5% | 100.0 |
| REFERENCE EXAMPLE 1-2 | 50 | polyvinyl pyrrolidone | 5% | polyoxyethylene alkylamino ether | 12 | 10 | 5% | 100.0 |

R is a carbon number of alkyl group
EO is the number of moles of ethylene oxide (m1 + n1)
CB is a conductive carbon material As shown in TABLE 5, when a lithium transition metal oxide with the Ni ratio of 50% was used as a positive electrode active material, there was no difference in the battery capacity between the test cell in REFERENCE EXAMPLE 1-2 including a positive electrode mixture layer containing a polymer compound that is soluble in N-methyl-2-pyrrolidone and has a ring structure in a repeating unit and a polyoxyethylene amine compound and the test cell in REFERENCE EXAMPLE 1-1 including a positive electrode mixture layer containing neither a polymer compound that is soluble in N-methyl-2-pyrrolidone and has a ring structure in a repeating unit nor a polyoxyethylene amine compound.

REFERENCE SIGNS LIST 10 nonaqueous electrolyte secondary battery
11 positive electrode
12 negative electrode
13 separator
14 electrode assembly
15 battery case
16 exterior can
17 sealing structure
18, 19 insulating plate
20 positive electrode lead
21 negative electrode lead
22 protruding portion
23 filter
24 lower valve element
25 insulating member
26 upper valve element
27 cap
28 gasket
30 positive electrode collector
31 positive electrode mixture layer

The invention claimed is:

1. A positive electrode for a nonaqueous electrolyte secondary battery, comprising:
   a collector; and
   a mixture layer formed on the collector, wherein
   the mixture layer comprises:
      a lithium transition metal oxide that contains more than 50% by mole of Ni relative to the total number of moles of metal elements other than Li;
      a carbon material;
      a polymer compound that is soluble in N-methyl-2-pyrrolidone and has a ring structure in a repeating unit; and
      a polyoxyethylene amine compound,
   wherein the mixture layer contains the polyoxyethylene amine compound in a range of 1 to 50% by mass relative to a mass of the carbon material.

2. The nonaqueous electrolyte secondary battery positive electrode according to claim 1, wherein
   the ring structure of the polymer compound is a 5 or more membered ring structure.

3. The nonaqueous electrolyte secondary battery positive electrode according to claim 1, wherein
   the polymer compound has a weight average molecular weight in a range of 10,000 to 2,000,000.

4. The nonaqueous electrolyte secondary battery positive electrode according to claim 1, wherein
   the polymer compound comprises at least one of a cellulose polymer compound or a vinyl polymer compound.

5. The nonaqueous electrolyte secondary battery positive electrode according to claim 1, wherein
   the mixture layer contains the polymer compound in a range of 1 to 50% by mass relative to a mass of the carbon material.

6. The nonaqueous electrolyte secondary battery positive electrode according to claim 1, wherein
   the polyoxyethylene amine compound comprises polyoxyethylene alkylamino ether.

7. A nonaqueous electrolyte secondary battery comprising:
   the positive electrode according to claim 1;
   a negative electrode: and
   a nonaqueous electrolyte.

* * * * *